United States Patent
Hughes et al.

(10) Patent No.: US 9,015,075 B2
(45) Date of Patent: Apr. 21, 2015

(54) METHOD AND APPARATUS FOR SECURE INFORMATION DISTRIBUTION

(75) Inventors: James P. Hughes, Palo Alto, CA (US); Robert F. Tow, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 2152 days.

(21) Appl. No.: 11/541,045

(22) Filed: Sep. 29, 2006

(65) Prior Publication Data

US 2008/0091605 A1      Apr. 17, 2008

(51) Int. Cl.
G06Q 10/00      (2012.01)
G06Q 30/00      (2012.01)
G06Q 20/30      (2012.01)
G06F 21/31      (2013.01)
G06F 21/78      (2013.01)
G06F 21/86      (2013.01)

(52) U.S. Cl.
CPC ............ *G06Q 30/0185* (2013.01); *G06Q 20/30* (2013.01); *G06F 21/31* (2013.01); *G06F 21/78* (2013.01); *G06F 21/86* (2013.01); *G06Q 2220/10* (2013.01); *G06F 2221/2143* (2013.01)

(58) Field of Classification Search
None
See application file for complete search history.

(56) References Cited

U.S. PATENT DOCUMENTS

| | | | |
|---|---|---|---|
| 5,128,671 A | | 7/1992 | Thomas, Jr. |
| 5,160,877 A | | 11/1992 | Fujiwara |
| 5,813,009 A | * | 9/1998 | Johnson et al. ............ 707/100 |
| 5,858,500 A | * | 1/1999 | MacPherson .............. 428/68 |
| 6,298,421 B1 | * | 10/2001 | Minamizawa et al. ....... 711/151 |
| 6,977,576 B2 | * | 12/2005 | Denison et al. ............. 340/5.73 |
| 6,982,642 B1 | | 1/2006 | Cesana |
| 7,155,590 B2 | * | 12/2006 | Mathis ..................... 711/164 |
| 7,365,737 B2 | * | 4/2008 | Marvit et al. ................ 345/156 |
| 7,552,467 B2 | * | 6/2009 | Lindsay .................... 726/5 |
| 2002/0059144 A1 | * | 5/2002 | Meffert et al. ................ 705/51 |
| 2005/0005161 A1 | * | 1/2005 | Baldwin ..................... 713/200 |
| 2005/0039040 A1 | * | 2/2005 | Ransom et al. ............. 713/200 |
| 2006/0049941 A1 | | 3/2006 | Hunter |
| 2006/0125643 A1 | * | 6/2006 | Skjellerup et al. .......... 340/572.9 |

OTHER PUBLICATIONS

W.L. Gore & Associates, "GORE Tamer Respondent Surface Enclosure", http://www.gore.com/MungoBlobs/612/1006surface_enclosure.pdf.

\* cited by examiner

*Primary Examiner* — Calvin L Hewitt, II
*Assistant Examiner* — Tim Hale
(74) *Attorney, Agent, or Firm* — Robert C. Kowert; Myertons, Hood, Kivlin, Kowert & Goetzel, P.C.

(57) ABSTRACT

A system and method for secure generation and distribution of digital encryption keys is disclosed. The system may also be used to protect and distribute other types of secure information, including digital, audio, video, or analog data, or physical objects. The system may include a tamper-respondent secure token device, which may be configured to destroy or disable access to the secure information contained therein in response to attempts to physically or electronically breach the device. Outputs may be provided in a secure manner through various interfaces without using electricity (wires) or electromagnetic radiation. Inputs may be provided in a secure manner, including through the use of a gesture-based input interface. Destruction or disablement of the device and/or its secure contents may be provided upon detection of tamper attempts or upon input of a self-destruct command. Proof of the destruction or disablement of the device or its contents may be provided.

12 Claims, 10 Drawing Sheets

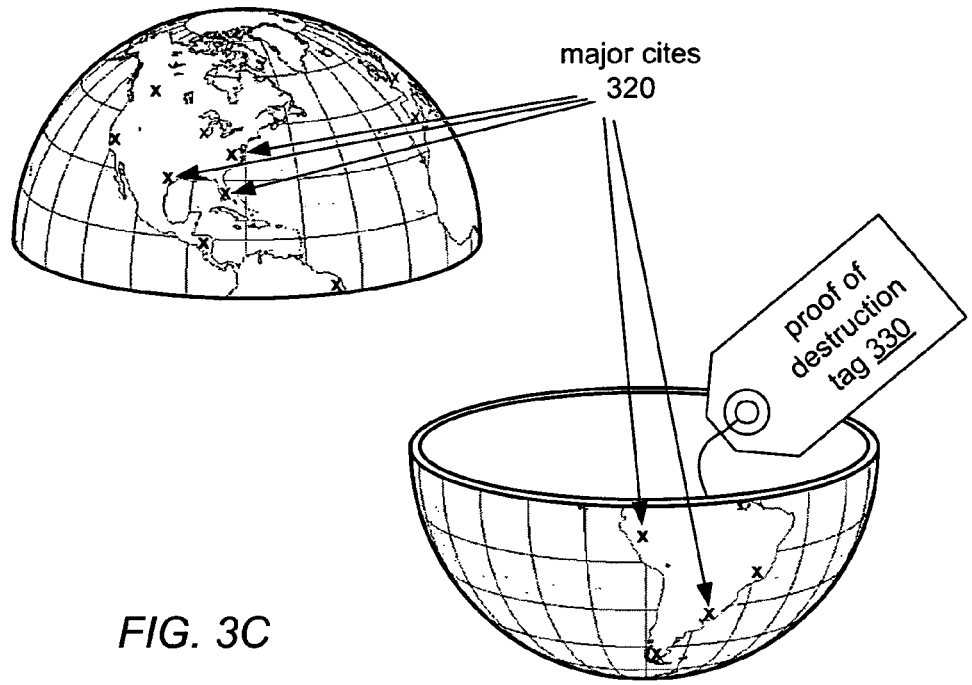
FIG. 3C
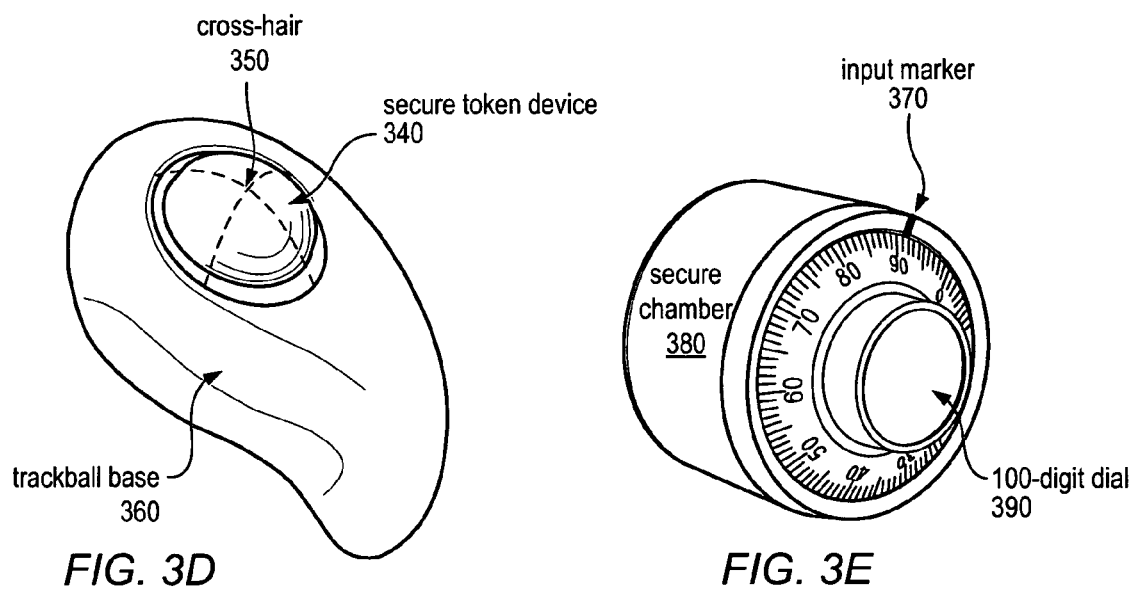
FIG. 3D
FIG. 3E

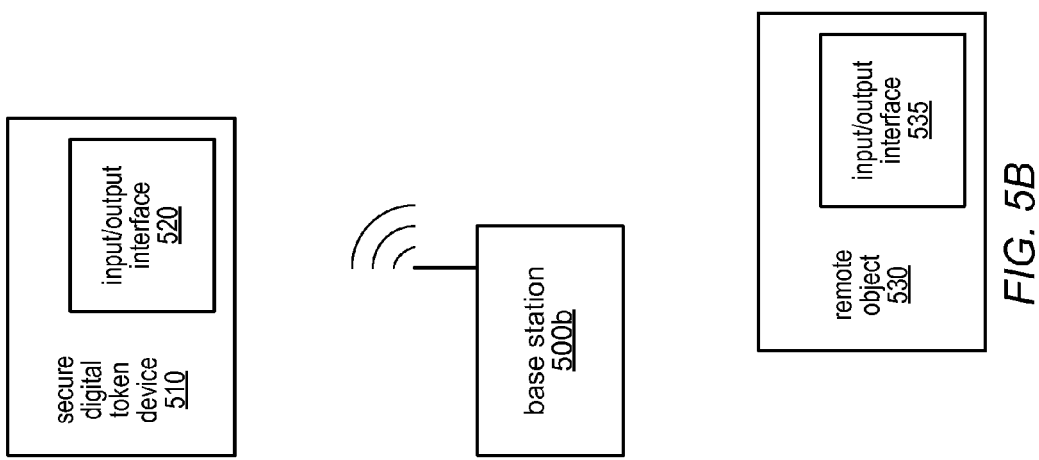
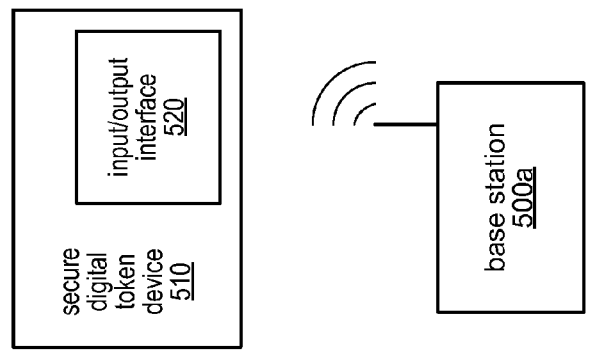

METHOD AND APPARATUS FOR SECURE INFORMATION DISTRIBUTION

BACKGROUND OF THE INVENTION

1. Field of the Invention

This invention relates to secure data communication and more specifically to a system and method for distributing secure digital information using a tamper-respondent device.

2. Description of the Relevant Art

Security issues have become a major concern in the area of digital communication. In order to address security concerns, the use of cryptography, digital certification, and digital signatures has been increasing in all areas of digital communication, including data transfers across networks, access to secure email servers and web servers, etc. Communication protocols involving the exchange of one or more encryption keys or other security information are becoming more and more common.

More and more of the devices exchanging information are relatively small computing devices, such as phones, PDAs, and other wireless, handheld devices. For these devices, conventional public-key cryptography systems (RSA, DH, DSA, etc.) may be impractical for small devices, in part because they involve the use of very large keys (e.g., 1024 bits), which may be cumbersome for a user to enter using the conventional input/output interfaces on these devices.

An alternate approach is to use a symmetric-key system. However, with symmetric-key systems, secure distribution of keys may be problematic. There is often not end-to-end security between users of a symmetric-key system. That is, there may be several security domain borders, at which the information may need to be decrypted and re-encrypted along the way. If one or more nodes along the path are compromised, the security of the entire network may be jeopardized. Another solution is to use public key encryption, such as encryption based on Elliptic Curve Cryptography (ECC). In public key encryption systems, even if the public key becomes known, a user may not be granted access to secure information until they enter a user-specific private key. In these systems, private keys are generated from the public key using a particular mathematical algorithm. Key generation may be performed on the small computing devices described above, but conventional small devices may not adequately protect the algorithm and authorization codes for generating keys from tampering and access by unauthorized users.

SUMMARY

A system and method for secure storage and secure communication of digital information are disclosed. In some embodiments, the digital information includes program instructions for generating digital encryption keys, while in other embodiments the digital information includes one or more of such encryption keys. In still other embodiments, the digital information is any other type of digital information, including any other program instructions or data, authorization codes for controlling a remote object, or audio or video information, in any of various formats suitable for storing in a memory. The system and method disclosed herein may in some embodiments be applied to the storage, protection, and/or destruction of continuously varying analog data, such as the value stored in a capacitor or other analog device, in addition to or instead of digital information (e.g., binary zeros and ones, trinary, decimal, or other stepped data representations.)

The system and method disclosed herein may include a tamper-respondent device for storing and communicating secure digital information. In some embodiments, the device may detect an attempt to access the secure digital information (through a physical or electronic security breach of the device) and, in response, to disable access to and/or destroy the secure information. For example, if the stored information includes one or more encryption keys, data representing the keys may be erased or modified in response to an unauthorized attempt to access the keys. In another example, if the information includes program instructions for generating encryption keys, some or all of the program instructions may be erased or modified in response to an attempt to break open the device containing the memory in which the program instructions are stored. In yet another example, destroying the secure digital information may include damaging or destroying the device itself in response to unauthorized physical tampering or electronic access attempts, such as by detonating an explosive charge, causing an electrical short circuit, or by other means.

The system and method disclosed herein may in some embodiments include a mechanism for receiving an authorization code before allowing access to stored secure information. For example, a user may be required to enter an authorization code before being able to use the device to generate or output digital encryption keys. In some embodiments, the input mechanism may allow a user to input the authorization code without intervening wires, such as if the device is enclosed in a sealed container without a wired connection to the external world. In some embodiments, a gesture-based input interface may be used to sense the orientation of the device in a gravitational field and a user may perform a series of orientation changes (gestures) in order to command and control the device. For example, the device may, in one embodiment, be made as a die, and letters or numbers may be inscribed on each face of the die. In this example, by orienting the device on a table-top such that a desired sequence of letters or numbers is visible on the topmost die face, a user may enter a PIN or a command. In another embodiment, the device may by configured to detect gestures that correspond to acceleration vectors that may be detected in free fall, or against the background of a gravitational field in addition to, or instead of, gestures that result in a change of orientation in a gravitational field.

In some embodiments, if the input sequence entered does not match a valid command or authorization code, the device may be configured to disable access to the secure information stored therein and/or to destroy the stored secure information. In some embodiments, the system and method may enable an authorized user to input a self-destruct command, resulting in the assured destruction of the device and/or the secure information contained therein. The device may include a physical receipt providing proof of the destruction of the device and/or the secure information, in some embodiments.

The device, which may be referred to as a "secure digital token device" or merely a "secure token device", may also include means to communicate the stored secure information or the results of the execution of stored program instruction, such as stored or generated digital encryption keys, to the external world. In some embodiments, communicating the information externally may be performed without intervening wires, such as through a sealed container or housing of the device. For example, secure information may be communicated externally via radio or other means (e.g., infrared, magnetic near field, visible light, vibration, sound, etc.), in different embodiments.

The secure token device described herein may be used for communication between two or more users, in some embodiments. For example, one authorized user may store sensitive digital information in the device and may ship it to a second authorized user. The second authorized user may access the information and, in some embodiments, modify the information and send the device back to the first authorized user, such as with a reply to a message, or confirmation of the receipt of the information. In other embodiments, the second user may ship the device to a third authorized user, either with the original secure information intact, or with information modified by the second authorized user. If the device ever falls into the hands of an unauthorized user that attempts to access the secure information, such as during transport between authorized users, the tamper-respondent device may detect that it has been compromised and may disable access to the information.

The tamper-respondent secure token device and secure communication methods described herein may in various embodiments allow for the secure distribution of encryption keys or any other sensitive information while protecting the information from unauthorized physical or electronic breaches.

BRIEF DESCRIPTION OF THE DRAWINGS

FIGS. 3A-3E illustrate various embodiments of a secure digital token device.

FIGS. 5A and 5B illustrate a computing system suitable for communicating secure digital information, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A device for storing and distributing secure digital information may be used to provide digital encryption keys for various computing and communication applications. In some embodiments, the device may be configured to generate, store and distribute digital encryption keys for authorized users, while in others it may only store the keys (i.e., keys generated elsewhere) for distribution. In still other embodiments, the device may store other types of secure information, as will be discussed in more detail below.

Figure 1A:
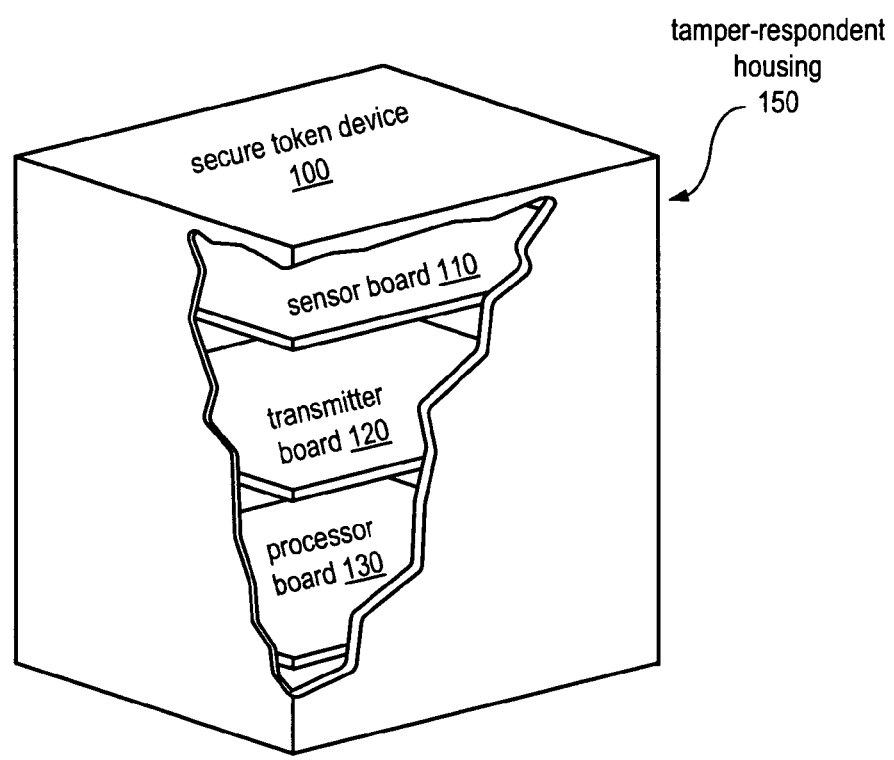
FIGS. 1A and 1B illustrate a secure digital token device comprising a tamper-respondent housing or tamper-detecting membrane surrounding multiple printed circuit boards, according to two embodiments.
Figure 1B:
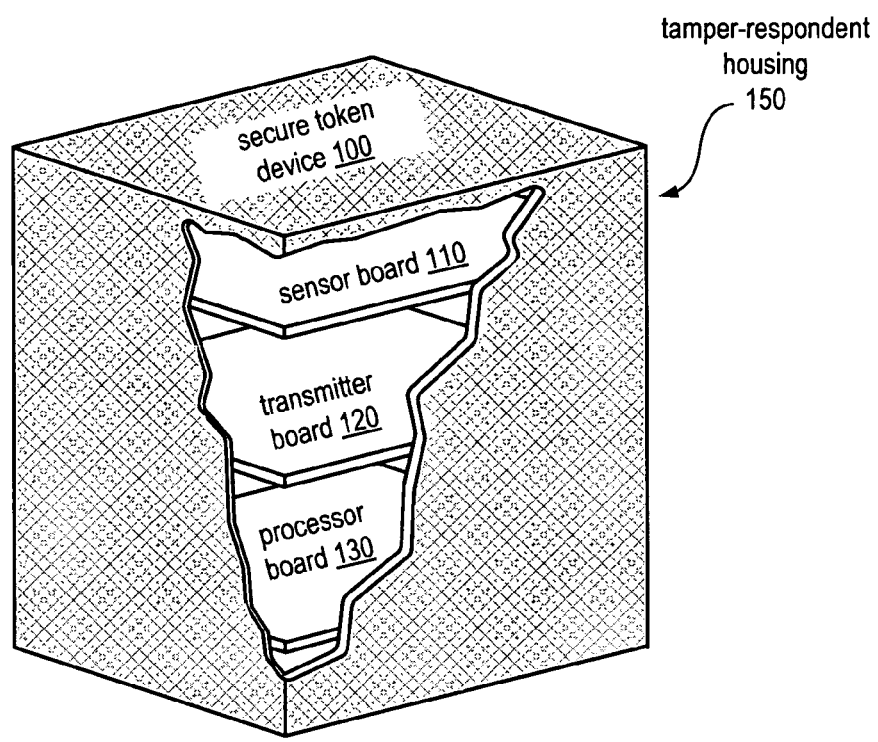

The secure digital token device may in some embodiments include one or more printed circuit boards enclosed within a tamper-respondent housing. In one example, shown in FIG. 1A, a secure digital token device 100, which includes a cube-shaped tamper-respondent housing, is illustrated using a cut-away view to reveal several printed circuit boards enclosed within the housing. In this example, secure token device 100 may include a processor board 130, a sensor board 110, and a transmitter board 120. In some embodiments, the device may comprise a Sun SPOT™ device enclosed in a tamper-respondent housing. A second example, illustrated in FIG. 1B includes a tamper-detecting membrane 150, which is described in more detail below.

Processor board 130 may include a processor configured to execute program instructions for controlling the operation of the device. For example, in some embodiments, processor board 130 may include an integrated circuit device based on an ARM920T™ core. Processor board 130 may include a non-volatile memory, such as a Flash memory, for storing the secure digital information and for storing program instructions, in some embodiments. In other embodiments, separate memories may be used for storing the secure digital information and program instructions. In some embodiments, processor board 130 may also include another memory, such as a small static RAM, which may always be powered on. In some embodiments, one or more of these memories may not be included on processor board 130, such as if they are included on a different board with the device.

Processor board 130 may in some embodiments also include other components and functionality, which may or may not be used in implementing the invention disclosed herein. For example, processor board 130 may include one or more USB interfaces or other interfaces for communication between the components within the device and a battery (e.g., a rechargeable 750 mAh lithium-ion battery). In some embodiments, processor board 130 may include features suitable for operating using very low power consumption, such as one or more low-power modes (including a deep sleep mode), for longer battery life. In some embodiments, processor board 130 may be a Sun SPOT™ processor board.

In some embodiments, secure token device 100 may include Faraday cage shielding around the device. The Faraday shielding may be configured to thwart electronic/electromagnetic passive or active attempts to detect signals or data within secure token device 100. In some embodiments, secure token device 100 may be enclosed in a sealed housing, such as housing 150 in FIG. 1A, which may or may not be tamper-respondent. Secure token device 100 may in some embodiments communicate externally, without wires extending outside the device, such as for entering one or more authorization codes to enable and command the device, and for entering and retrieving secure digital information.

In some embodiments, an input/output interface may include sensors for detecting a gesture made by a user of the device by changing the position of the device. In such embodiments, a sensor board included in secure token device 100, such as sensor board 110, may contain one or more sensors for detecting movement, such as one or more 3-axis accelerometers (e.g., 2G or 6G accelerometers), and the processor may analyze the data gathered by these sensors to determine one or more data values entered by a user of the device. As previously noted, an input/output interface may in some embodiments include sensors to detect rotations and/or acceleration in free fall or against the background of a gravitational field. For example, gyroscopic sensors such as ring gyros or MEMs gyros may be included in addition to, or instead of, sensors that detect orientation within a fixed gravitational field.

The input/output interface may in some embodiments include sensors for detecting and/or measuring light, sound, temperature, or pressure, and the processor may analyze the data gathered by these sensors to determine one or more data values entered by a user of the device. In still other embodiments, secure token device 100 may include a receiver suitable for receiving transmitted signals, such as an IEEE 802.15 (Bluetooth) compliant radio with an integrated antenna, and these signals may represent one or more data values entered by a user of the device. In some embodiments, sensor board 110 may also include other components which may or may not be used in the implementation of the present invention, such as one or more tri-color LEDs, analog inputs, momentary switches, general purpose I/O pins, or high current output pins.

Transmitter board 120 of secure token device 100 may include circuitry for communicating the secure digital information outside the device, in some embodiments. For example, in some embodiments transmitter board 120 may include circuitry or other means for communicating the secure information, e.g., by transmitting radio waves or an infrared signal, through magnetic near field communication, or by generating a representation of the information using visible or infrared light, vibration, sound, etc. Transmitter board 120 may include an IEEE 802.15 radio, for example, which may serve as both a receiver (as described above regarding sensor board 110) and a transmitter, in some embodiments.

While secure token device 100 is described above as consisting of three separate printed circuit boards, in some embodiments, the components and functionality of the boards described may be partitioned differently and included on more or fewer boards, or as stand-alone components of a secure digital token device. In other embodiments, all of the components and functionality described above may be included on a single printed circuit board or in a single integrated circuit device.

Secure token device 100 may include tamper-respondent circuitry to disable access to the stored secure digital information if the device is physically compromised, in some embodiments. For example, in some embodiments, the one or more printed circuit boards above may be enclosed in a housing (illustrated as tamper-respondent housing 150 in FIG. 1A and tamper-detecting membrane 150 in FIG. 1B) that is integrated with or enclosed in a tamper-responsive technology to produce a tamper-respondent device. An example of such tamper-responsive technology is available from W. L. Gore & Associates, Inc. In such embodiments, the tamper-responsive technology may provide an active layer of protection surrounding electronic devices by wrapping them in a tamper-detecting membrane. This membrane may employ a small "always powered on" tamper-responsive circuit that protects a static RAM. The membrane may be comprised of a mesh of delicate wiring that is monitored from inside the wrapping. In one example, compromising a tamper-detecting membrane may cause a short or open in a tamper-responsive circuit. If someone or something attempts to penetrate the mesh, such as to reverse engineer the enclosed device, power to the electronics may be momentarily interrupted and the static RAM erased. In some embodiments, when power is restored following the momentary interruption, the processor may detect that the static RAM has been erased, and, in response, may determine that the device has been compromised.

The secure digital token device may be made tamper-respondent by means other than by using the Gore™ technology, in some embodiments. For example, in some embodiments, the device may be sealed in an enclosure which is configured to detect tampering by detecting that a seal or seam of the enclosure has been broken, such as if breaking a seal causes a break in a circuit, a change in resistance, a change in the pressure inside the device, or by other means. In some embodiments, in addition to a tamper-detecting membrane or other tamper-respondent housing, the secure token device may be encased in a covering that is difficult to penetrate, such as one or more layers of a rosin coating or other material used for armored applications (e.g., ballistic cloth, metal, or ceramic materials.)

In some embodiments, if the tamper-detecting covering is physically compromised, the tamper-responsive circuit may be configured to erase or modify the contents of the static RAM described above. In some embodiments, the RAM may be used to store the secure digital information itself. In such embodiments, erasing or modifying the RAM may result in the secure digital information being obliterated. In other embodiments, the RAM may store one or more keys (i.e., memory holding keys) that are used to protect a non-volatile memory containing the secure digital information. In such embodiments, the tamper-responsive circuitry may erase the RAM, and the processor may be configured to detect that the RAM has been erased and, in response, to disable access to secure digital information stored in the non-volatile memory.

As noted above, the secure digital token may include a Faraday cage or other shielding to prevent electrical signals from passing into or out of the device, in some embodiments. Thus, any program instructions executing within the device and/or any data, addresses, or other signals communicated between components within the device may not be detectable by an external snooping-type device. In such embodiments, a gesture-based input method may be used to enter commands and/or other information into the device. For example, because gravity permeates even a shielded device, the device may be configured to sense the orientation of the device in a gravitational field, and a series of orientation and/or position changes may be used to input data, authorization codes, PINs, and/or commands for controlling the device. In another example, acceleration vectors may be detected in zero gravity or against a background gravity field (e.g., "move sharply to the right twice, followed by sharply to the left, sharply up," etc.) Similarly, movements resulting in zero crossings may be detected in a free fall or against a background gravity field.

Letters, numbers, words, symbols, glyphs, or other easily distinguishable marks may be printed, embossed, or etched onto the faces of the secure token device to assist a user in putting the device into its correct position sequence or in otherwise orienting the device in order to enter commands and/or data, in some embodiments. In various embodiments, if an incorrect position sequence is detected, the device may deny the user access to the secure information. If too many incorrect positions or gestures are detected, the device may be configured to respond as if it has fallen into unauthorized hands (i.e., into the hands of an unauthorized user that is trying to guess its position sequence) and may permanently disable access to the secure information it stores or may disable access to the secure information until corrective action is taken by an authorized user.

Figure 2A:
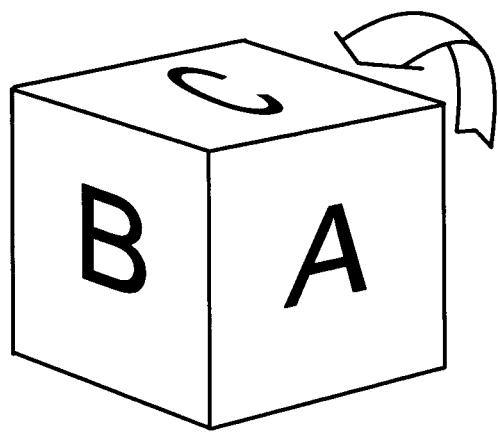
FIGS. 2A-2C illustrate various gestures performed using a secure digital token device, according to one embodiment.
Figure 2B:
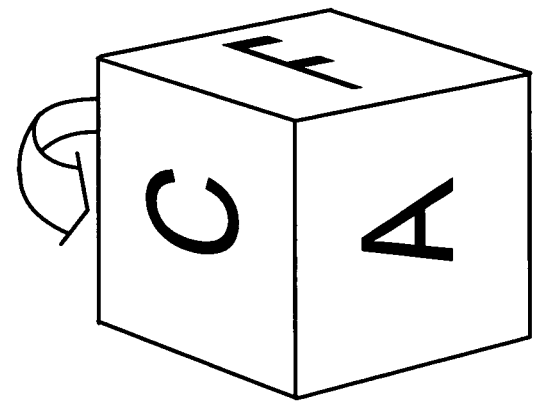
Figure 2C:
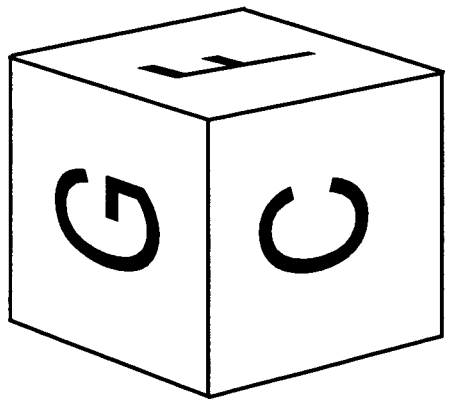

In some embodiments, such as the one illustrated by FIGS. 2A-2C, the secure token device may be configured as a die. In this example, the device appears as a simple cubic solid with the first six letters of the alphabet printed on its faces. In other embodiments, a die may include any combination of letters, numbers, or other symbols inscribed on each face of the die. In these embodiments and others, a user may awaken the device's internal computer (e.g., its processor board 130) from a low-power mode by moving the device, such as by shaking it. In this example, sensor board 110 may include a 3-axis accelerometer. To enter a data or a command, the user may put the device into a particular position, orienting it with a particular face up (e.g., the faced marked "A"). After a short dwell period, the device may provide an indication that the first position in a sequence was detected and logged/tracked, as described below. The user may then orient the device so that another face is up (e.g., the face marked "B"). Again, the device may indicate acceptance of the input. This may continue until an entire position sequence has been input by the user. In some embodiments, different length sequences may represent differing levels of security. After logging a sequence, the device may check to see if the sequence is valid entry, such as one representing a valid authorization code, command sequence, etc. If so, the device may grant the user access to the secure information stored within its memory, in some embodiments.

In the example illustrated by FIGS. 2A-2C, a user may enter a data value or other input by orienting the device on a table-top such that a desired sequence of symbols is visible on the topmost die face. FIG. 2A illustrates a die with the letter "C" visible on its topmost face. This position may represent a required initial position or may represent a first data value entered, according to different embodiments. By rotating the device one-quarter turn (90 degrees) in the direction illustrated by the arrow in FIG. 2A, the device may be placed in the position illustrated by FIG. 2B. After this rotation, the letter "F" is visible on the topmost face of the device. Therefore, the sequence of symbols entered in this example, so far, is "C, F." In this and other embodiments, an input sequence may represent a data value, an authorization code (such as a PIN), or a command for controlling the device, and may consist of any number of symbols, according to various embodiments.

In some embodiments, a change in orientation may be detected with respect to a different face or with reference only to the previous (and possibly arbitrary) position of the device. For example, when the die-based device illustrated in FIG. 2B is rotated one-quarter turn in the direction illustrated by the arrow in FIG. 2B, the device may be placed in the position illustrated by FIG. 2C. While the letter "F" is still visible on the topmost face of the device, the device has been rotated from its previous position and this rotation may be detected by sensors within the device. In some embodiments, this information, rather than the series of symbols visible on the topmost face, for example, may represent an input data sequence. In this example, the sequence of orientation changes, or rotations performed in FIGS. 2A-2C (i.e., "rotate right side 90 degrees to top", "rotate left side 90 degrees to front") may represent a data value, an authorization code (such as a PIN), or a command for controlling the device. Such rotation sequences may consist of any number of rotations or direction changes, according to various embodiments. To detect one or more position or direction/rotation changes, the device may include one or more three-axis MEMS accelerometers, such as the one provided in the Sun SPOT™ wireless networked sensor platform from Sun Labs, or any other sensor or combination of sensors suitable for detecting a position change, a rotation or other movement (e.g., a linear movement) of a secure token device containing the sensor(s).

In some embodiments, the secure token device may be configured to capture or recognize a position or rotation only after the gesture has been performed and then the device has remained in a fixed position for a given time period. For example, a user may pick the device up from a table, rotate it, and place back on the table to indicate the next input value. In this example, the device may be configured to sense that the device has stopped moving, e.g., by sensing no movement for two full seconds, and then to determine the new position of the device and/or the rotation that was performed. In some embodiments, the device may be configured to provide auditory feedback, such as a "click" sound, for each position change in a gravitational field resulting in an input transition from one position or direction/rotation value to another. In other embodiments, another type of feedback may be used to indicate that a new position or rotation value has been input, such as the blinking of an LED, a vibration of the device, or any other suitable indication that a transition has been detected.

In some embodiments, the use of a gesture-based input interface may enable the device to be implemented as a hermetically sealed, cryptographically secured device. Such a device may in some embodiments be suitable for use in hostile environments. The device may be further protected from tampering by integrating it with an impervious and/or tamper-respondent housing, as described herein.

While the example described above involves a device constructed as a cube, similar to a die, the secure digital token device may be implemented in any shape or form factor, according to different embodiments. FIGS. 3A-3E, for example, illustrate various examples of shapes and form factors suitable for implementation of the invention, and will be described in more detail below.

Figure 3A:
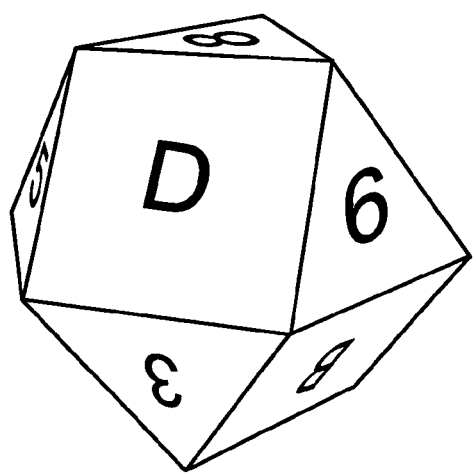
Figure 3B:
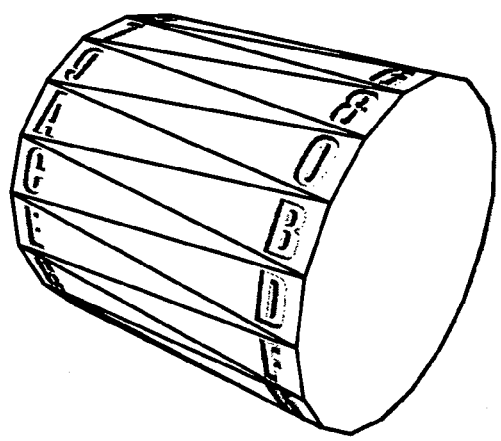

One shape type suitable for implementation of the invention is a polyhedral solid, (e.g., Platonic or Archimedean). These solids may include, for example, a 12-sided shape, or dodecahedron, displaying 12 different letters. In one embodiment, illustrated in FIG. 3A, the device may be implemented as a 14-sided shape (a cuboctahedron). In this example, the device includes 6 letters on its triangular faces and 8 digits on its square faces, although any combination of letters, numbers, and/or other symbols may be indicated on any of the faces. In this example, a user may enter a sequence of letters and digits by orienting the solid such that one face at a time is "up" to indicate a sequence. FIG. 3A, for example, illustrates a cuboctahedron in which the face marked "8" is visible as the topmost face, and which may represent the next element in an input sequence. In some embodiments, a user may indicate that he or she wants to enter a new sequence by shaking the device for a period of time (e.g., several seconds), or by leaving it still for a period of time (e.g., for one minute.) In various embodiments, the markings on the device used to assist the user in performing the appropriate gestures may not be simply letters and numbers, but may be any glyphs that can be remembered by the user (e.g., signs of the zodiac, emoticons, etc.) In still other embodiments, there may be no markings on the device, as the gestures themselves (i.e., relative to a previous arbitrary position and not to a particular position or marking) represent an input sequence to the device.

In some embodiments, a sound or vibration may indicate that an input to the sequence has been accepted. If a user does not wait for an indication that an input is accepted before attempting to enter another input, the device may be configured to indicate an error and/or a rejection of the previous input, such as by using a different sound or a vibration of a different length than that used to indicate that an input has been accepted. In some embodiments, such as those in which the device is configured to detect which face is "up" once the device is positioned, any movements executed between the entry of each sequence element may be ignored. For example, if a user turns the device around several times or rotates it back and forth before identifying the face corresponding to the next element in the sequence and positioning that face in the "up" position, the device may be configured to ignore all the movements until the device is positioned and remains still for the prescribed dwell period. In other embodiments, such as those in which the movements themselves (e.g., the rotations or direction changes) comprise the sequence, the device may be configured to detect and track all the movements between the times that the device is positioned and still.

A user may prime the device to accept a new sequence or may reset a sequence to the start, in some embodiments. For example, in one embodiment, a user may shake the device for several seconds and then leave it still for one minute to indicate that a new sequence will be entered. In another embodiment, a user may position a particular face "up" to prime the device to receive a new input sequence. In other embodiments, other gestures or other means may be used to prime or reset the device so that it may receive a new input sequence.

Another polyhedron that may lend itself to the invention is the anti-prism. In one embodiment, illustrated in FIG. 3B, a device of this type is shown as a 36-sided "soup can" device (i.e., an object having 38 sides, if top and bottom are included). In this example, each side of the device has a letter or digit inscribed on it. Combination sequences may be entered for this device by rolling the device until the desired letter is facing up, for example. The sequence may consist of the sequence of letters or digits facing up after each "roll", similar to the cube and cuboctahedron examples. In other embodiments the sequence may consist of a series of rolls of specific lengths and directions, rather than of ending positions. For example, from an arbitrary position, the sequence may include "roll 3 faces clockwise", "roll 10 more faces clockwise", "roll 15 faces counterclockwise," etc. In another example, the starting position may not be arbitrary, but may represent one of one or more initial positions for one or more sequences or types of sequences. Acceptance of an input to the sequence may be signaled with sound, light, vibration(s), or other means, as in other embodiments. A user may indicate that a new sequence will be entered by turning the can up on one end for several seconds, for example. As discussed above regarding other examples, in some embodiments movements executed between sequence elements may be ignored while in others all movements may be detected and logged/tracked. As with the convex polyhedral devices, both the number of faces and identifying symbol sets are not limited, but may be of any number and may consist of any easily distinguishable markings or no markings at all, according to various embodiments.

An extreme example of a polyhedral type device that may be suitable for implementing the invention is a sphere covered with any number of regularly-spaced or arbitrarily-spaced symbols. For example, a world globe, including labeled or unlabeled major cities marked on its surface, may be used to implement the device. In one embodiment, the device may be placed in a base for charging, but it may be manipulated while being held up (i.e., away from the base) to enter an input sequence. An example of such a device is illustrated in FIG. 3C. As illustrated, the device is marked with several Xs at locations corresponding to major world cities. In this example, an input sequence may include a series of cities, such as, "Paris", "Cairo", "Johannesburg", "New York." Each city may be entered into the sequence by placing the globe in a position such that the city is "face up", or at a "true vertical" position for a given period of time. In another embodiment, each city may be entered into the sequence by placing the globe in a position such that the city is visible through a reticule or other "window" of the device, which may or may not correspond to a vertical position. In some embodiments, the user may indicate that a new sequence will be entered by shaking or rotating the globe for several seconds.

The example shown in FIG. 3C illustrates that the secure token device may in many embodiments include a hollow housing (e.g., a hollow globe), so that it may enclose one or more printed circuit boards implementing the functions of the secure token device described herein. FIG. 3C also illustrates a proof of destruction tag 330, which will be described in more detail later.

A sphere-shaped secure token device (e.g., a globe) may, in some embodiments, be cradled in a trackball base. In some such embodiments, the device may also serve as a computer trackball. An example of such a device is illustrated in FIG. 3D as secure token device 340. In some embodiments, trackball base 360 may charge secure token device 340, such as by using inductive coupling, when secure token device 340 is parked on trackball base 360. In an embodiment in which the device may be manipulated like a trackball (whether or not it serves as a functional computer trackball), each sequence element may be entered by manipulating the device so that one of the markings on the sphere is aligned with crosshair 350 of trackball base 360. For example, secure token device 340 (e.g., a globe) may be placed in an enclosure in trackball base 360 comprising a window marked with a crosshair 350 that is used to select the next sequence element (e.g., each city) marking on the sphere (globe). Thus, the device may not be limited to detecting a marking at the "top" position or at a true vertical position.

When the device comprises a trackball-type configuration, a user may indicate that a new sequence is beginning by spinning secure token device 340 in trackball base 360 for several seconds or by placing a particular marking (e.g., the North Pole) in crosshair 350, in some embodiments. In some embodiments, secure token device 340 may vibrate or emit a sound to indicate that a city has been registered as a sequence element. In other embodiments, the device (globe) may use light for user feedback, such as by lighting up the city's marking or lighting the entire globe when an input has been detected.

While the examples described herein involving sphere-shaped objects are patterned as globes, in other embodiments the device may be implemented using a sphere having any type of markings that may be distinguishable by a user for entering a sequence of gestures by manipulating the sphere.

As described above, a gesture-based input interface may in some embodiments be implemented using wireless sensors to detect gestures that reposition the device itself in order to control it. In other embodiments, the device may include a dial or knob and a gesture-based input interface may be configured to detect a position or direction change in the dial or knob. For example, the gesture-based input interface may detect a series of digits entered using the dial (e.g., "27", "14", "63") or a series of movements of particular lengths and in particular directions (e.g., "4 digits to right", "15 more digits to right", "23 digits to left.") The secure token device described herein may be implemented in a housing having any arbitrary shape or form factor, and is not limited to regular polyhedral shapes. Another type of housing that may be suitable for implementation of the device is a modified safe dial, with circuitry located inside a closed box coupled to the dial.

In some embodiments, the dial may be large enough that all the components of the device may be contained within the dial itself, rather than in a closed box coupled to the dial. An example of such a device is illustrated in FIG. 3E. Successfully entering a gesture sequence (e.g., by aligning two or more digit markings on 100-digit dial 390 with input marker 370 in a valid sequence) may result in the device sending an "unlock" signal to a locked object. In one embodiment, the unlock signal may unlock a physical lock. For example, the unlock signal may unlock secure chamber 390, which may contain a secure physical object. In other embodiments, successfully entering a valid gesture sequence may indicate to circuitry inside secure chamber 390 that secure digital information may be communicated to the user (e.g., by transmitting it externally.)

In some embodiments, a secure token device comprising a safe dial (e.g., a 72-digit or 100-digit safe dial) may provide tactile feedback when a sequence of digits or direction changes is detected. In some embodiments, vibration, sound, or light may be used to indicate that a sequence element has been detected. As was described in other examples, a dwell time may be specified and the position of the dial may be detected when it has remained in position for the specified dwell period. In some embodiments, the digits themselves may represent a data or command sequence, and the path taken between numbers in the sequence may be unimportant. In other embodiments, the rotation directions and distances (i.e., from a pre-defined or an arbitrary starting point) may represent the sequence. In some embodiments, the dial may be marked with symbols other than digits, such as letters, pictographs, words, or any marking distinguishable by a user. In embodiments comprising a safe dial, the user may rotate the dial for several seconds or may perform several full (i.e., 360 degrees) turns to indicate a desire to enter a new sequence.

As noted above, a sequence entered into a secure digital token device, as described herein, may represent data, an authorization code, or a command to control the device, in various embodiments and at various times. Various combinations of data, authorization codes, and commands may be entered to perform different tasks involving the device. For example, in one embodiment, in order to load the device with secure digital information, a user may enter an authorization code and one or more commands in addition to the data itself. In another example, to retrieve information from the device, a user may enter an authorization code and one or more device commands.

Figure 4:
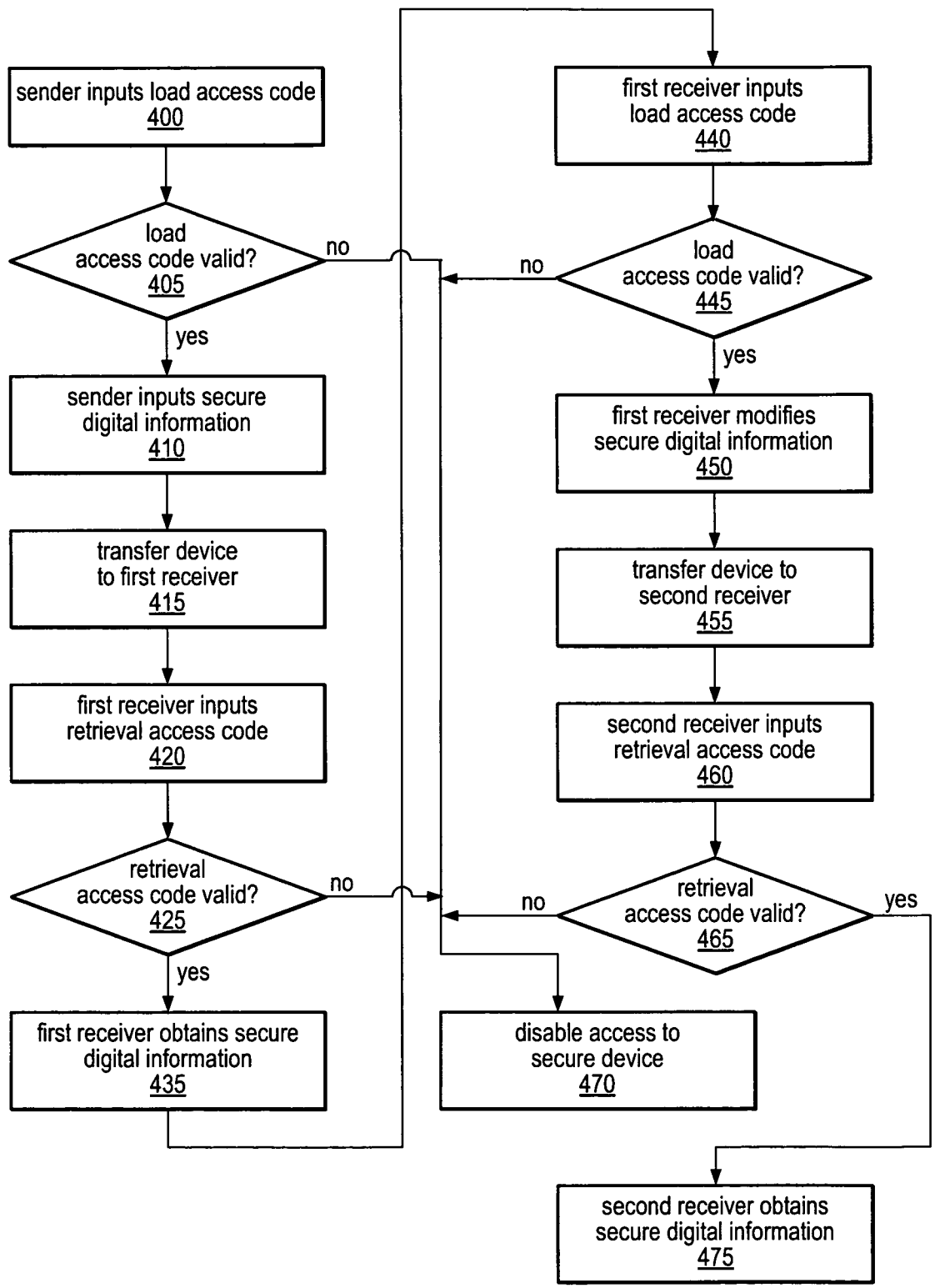
FIG. 4 illustrates a method of communicating secure digital information, according to one embodiment.

The secure token device may be used to facilitate secure digital communication between multiple users by first loading information into the device, transporting it to another user, and the other user retrieving the information, in some embodiments. An example of a method for secure digital communication is illustrated in FIG. 4. In this example, a first user, or sender, may enter a load access code into the device, as in 400. In some embodiments, this load access code may be entered using a gesture-based input interface, as described herein. The load access code may be specific to the user, or it may be an access code shared by multiple authorized users of the device, in different embodiments. The load access code may consist of an authorization code portion and a "load data" command portion, in some embodiments. In other embodiments, only a user who has already been authorized to enter commands through a previous operation (not shown) may enter the load access code.

Once the load access code has been entered, the processor of the device may be configured to validate the load access code, as in 405. If the load access code is valid, as indicated by the positive exit from 405, the sender may proceed to enter secure digital information, as in 410. The secure digital information may be input using a gesture-based input interface, in some embodiments. For example, a character string, corresponding to a sequence of characters on the device, may be entered into the device using the gesture-based input interface described herein. In other embodiments, the load access command may configure the device to receive the secure digital information through another interface, such as by receiving a digital, audio or video transmission through a wireless link or by other means. The secure digital information may be transmitted to the device from a base station, in some embodiments, and successfully entering a load access command may also cause the device to signal the base station that it may begin transmission of the information. In some embodiments, the load access command, or an additional input entered following the load access command, may include an indication of one or more memory locations (e.g., virtual or physical addresses) at which the device should store the secure information in its memory and may also indicate the amount of data to be loaded.

If the load access code is not valid, as indicated by the negative exit from 405, the device may be configured to disable access to the device, as shown in 470. Disabling access to the device may be carried out in different ways according to different embodiments and will be discussed in more detail later.

In some embodiments, the secure token device may be configured to have secure digital information loaded only once, such as when the device is manufactured or assembled. For example, the secure information may be programmed in ROM or in an EEPROM for which the means for re-programming the memory have been disabled. In another embodiment, the secure token device may be programmed using commands and/or data received through an interface other than a gesture-based input interface, such as through a wired or wireless programming interface controlled through the base station during or after manufacturing/assembly. In these and similar embodiments, users of the device may not perform the operations illustrated in FIG. 4, blocks 400-410.

Once the device has been loaded with secure digital information, either by a user or during manufacturing/assembly, the device may be transferred to a first receiving user, as in 415. In some embodiments, the device may be transported over a great distance, and may be subjected to vibrations, rotations, and/or other movement during transport. In some embodiments, the device may be configured such that the sender may disable the gesture-based input interface before transport and a receiving user may enable the gesture-based input when it reaches its destination. For example, a command may be entered into the device to put the device in a deep sleep mode for a period of hours, days, or weeks, and the device may be configured to "wake up" and recognize gesture-based inputs only after that period of time. In another example, the device may be configured to wake up only if the receiving user enters a "wake up" command after the sleep mode period has expired. In still another example, the device may be configured to detect, but ignore, gesture-based inputs until a predetermined sleep mode period expires (e.g., one corresponding to the expected transportation time) or until the device reaches its destination. For example, the device may be configured to receive a wireless signal indicating the location of the device, (such as if the device includes a GPS function), and to wake up and/or recognize gesture-based inputs when it reaches its destination.

When the first receiving user receives the device, he or she may enter a retrieval access code into the device, as in 420. In some embodiments, this access code may be entered using a gesture-based input interface, as described herein. The access code may be specific to the user, or may be shared by multiple authorized users of the device, in different embodiments. The access code may consist of an authorization code portion and a "retrieve data" command portion, in some embodiments. In other embodiments, two separate codes may be entered (e.g., one to authorize access to the device and one to indicate that information is to be retrieved), or a single retrieval access code may be used for both authorization and command purposes.

Once the retrieval access code has been entered, the processor of the device may be configured to validate the retrieval access code, as in 425. If the retrieval access code is valid, as indicated by the positive exit from 425, the first receiver may obtain the secure digital information, as in 435. The secure digital information may be output from the device directly, in some embodiments. For example, in one embodiment a radio may radiate inside the device with enough leakage/re-radiation to provide a signal through a Faraday cage, while the much weaker signals of the computer and its memory may be obscured. In other embodiments, sound signals or tones from a sounder inside the device may be detected externally by a microphone, in the manner of DTMF tones or a modem; a magnetic field may be modulated and externally detected; a visible or infrared light signal may be generated and detected through small transparent windows/pores in a tamper resistant membrane; or a solenoid may be used to vibrate the device in a digital manner so as to communicate with an enclosure that incorporates a vibration sensing mechanism (e.g., an accelerometer.)

If the retrieval access code entered is not valid, as indicated by the negative exit from 425, the device may be configured to disable access to the device, as shown in 470.

Once the first receiver has obtained the secure information from the secure token device, he or she may transport the device back to the sender or to another user unmodified, in some embodiments. In other embodiments, the first receiver may modify the secure information before sending it to another user, such as by entering additional information, deleting the original information and replacing it with different information, etc. To modify the information, the receiving user may first enter a load access code, in some embodiments. This is illustrated in 440 of FIG. 4. The procedure for entering a load access code may be the same as described above for the original sender, and may include both an authorization code portion and a load/modify data command portion or may only include a load/modify data command. In some embodiments, the load/modify data command may be the same as the load data command described above, while in other embodiments, different codes may be used to specify loading data (i.e., loading data for the first time or replacing all existing data with new data) or modifying data (i.e., adding data to what exists in the secure device or modifying only certain memory locations within the device). As noted above, the load access command, or an additional input entered following the load access command, may in some embodiments include an indication of one or more memory locations (e.g., virtual or physical addresses) at which the device should store the secure information in its memory and may also indicate the amount of data to be loaded.

Once the load access code has been entered, the processor of the device may be configured to validate the load access code, as in 445. If the load access code entered is valid, as indicated by the positive exit from 445, the first receiver may proceed to enter the modified secure information, as in 450. The modified secure information may be input using a gesture-based input interface or by other means, as described above regarding 410. If the load access code is not valid, as indicated by the negative exit from 445, the device may be configured to disable access to the device, as in 470.

The device containing the modified secure information may then be transferred back to the original sender or to another receiving user, in different embodiments. Block 455 of FIG. 4 illustrates that the device is transferred to a second receiver. As previously noted, detection of gesture-based inputs may be disabled during transport or may simply be ignored until a time-out period has passed and/or the device reaches its destination.

When the second receiving user receives the secure token device, he or she may access the secure information in a manner similar to that described for the first receiving user. For example, the user may enter a retrieval access code (as in 460), the device may validate the retrieval access code (as in 465), and the device may enable access to the secure information in the secure token device in response to the access code being validated (as in 475.) If the retrieval access code is not valid, as indicated by the negative exit from 465, the device may be configured to disable access to the secure information, as in 470. As noted above, the valid access codes used by the second receiving user may be the same as, or different from, the valid access codes used by the sender and/or the first receiving user, according to different embodiments. The method illustrated in FIG. 4 and described above may also be used by one or more users to implement adaptively reprogramming the device to meet changing situations and conditions, in some embodiments.

In various embodiments, a secure token device may be used as a sort of general-purpose combination lock. As described herein, a user may be given access to various resources by orienting the device into a sequence of positions or poses (e.g., by dialing in the correct combination on a safe dial or manipulating a polyhedral solid using a series of gestures). For example, an authorized user of the device may enter a command to cause a computer file to be decrypted, an encryption key to be generated, an audio or video file to be transmitted or displayed, program instructions to be executed, or a data file to be transmitted. In another example, an authorized user of the device may enter a command to cause the transmission of a signal representing continuously varying analog data, such as the value stored in a capacitor or other analog device, in addition to or instead of other types of information. In some embodiments, when a valid "open" command sequence is input, a physical door on the object or on a remote object may unlock (physically), allowing access to a secure physical, rather than a secure digital, object. In other embodiments, a valid "open" command sequence may programmatically "unlock" a computer application or secure memory location for access by an authorized user. An example of a system for unlocking secure information using a secure token device is illustrated in FIGS. 5A and 5B.

In this example, a base station 500*a* and a secure digital token device 510 are shown in location 1 (FIG. 5A.) Secure token device 510 may be programmed, as described herein, when it is at location 1. For example, in one embodiment, input/output interface 520 of secure digital token device 510 may include a gesture-based input interface and secure digital token device 510 may be programmed by a user through this gesture-based input interface alone. In another embodiment, a user may enter a command using a gesture-based input interface and this may cause secure digital token device 510 to be programmed through communication with base station 500*a*. In this example, base station 500*a* may communicate with secure digital token device 510 through input/output interface 520, which may include a wireless interface configured to receive and/or transmit sound, light, video, or other data formats. In yet another embodiment, secure digital token device 510 may be programmed before or during its manufacture or assembly, such as by programming and/or installing a ROM, Flash memory, or other suitable memory device. In general, secure digital token device 510 may be programmed using any suitable method, including any of the methods described herein. Commands may be entered on secure digital token device 510 using a gesture-based input interface (e.g., by performing a series of gestures using a polyhedral object or entering a series of values on a safe dial) or by other means, according to different embodiments. Commands may be validated by circuitry contained in and/or program instructions executing on secure digital token device 510, in some embodiments. In other embodiments, commands may be validated by circuitry contained in and/or program instructions executing on base station 500a.

Secure digital token device 510 may be programmed in order to load it with secure information, such as secure data, encryption keys or digital keys for electronic locks, programming instructions for generating encryption keys, or any other secure information in any format, according to various embodiments. In some embodiments, secure token device 510 may include a secure chamber suitable for securing a physical object, such as a document, an integrated circuit device, or the circuitry for implementing the functions of the secure token device itself, and programming secure digital token device 510 may involve activating an electronic lock on the chamber to secure its contents. In another embodiment, programming the secure token device may involve resetting or initializing the state of an analog device, such as by charging a capacitor or biasing an analog circuit to a particular voltage.

Once secure digital token device 510 has been programmed, it may be transported to location 2, as shown in FIG. 5B. In some embodiments, secure digital token device 510 may be put in a deep sleep mode before being transported to location 2, and/or input/output interface 520 may be disabled during transport. For example, a user at location 1 may enter a command to put the device in a deep sleep mode for several days, corresponding to the expected duration of its trip to location 2.

Once secure digital token device 510 reaches location 2, a user (e.g., the same user or a different authorized user) may gain access to the secure information stored in the device by entering one or more commands through input/output interface 520. In some embodiments, one of the commands may be a "wake up" command, while in other embodiments, a user at location 2 may have to wait for the device to wake up on its own (e.g., if a predetermined sleep time was programmed) before entering commands.

As described above, a user at location 2 may access secure information directly from secure digital token device 510. For example, the user may enter a command that causes the device to "unlock" access to the information for the user at location 2 in response to a valid retrieval access command. Commands may be entered on secure digital token device 510 using a gesture-based input interface (e.g., by performing a series of gestures using a polyhedral object or entering a series of values on a safe dial) or by other means, according to different embodiments. Commands may be validated by circuitry contained in and/or program instructions executing on secure digital token device 510, in some embodiments. In other embodiments, commands may be validated by circuitry contained in and/or program instructions executing on base station 500b.

In some embodiments, a user may use the information stored in secure digital token device 510 to gain access to information on another device. For example, FIG. 5B illustrates a base station 500b at location 2. In some embodiments, once a user at location 2 has entered a valid command on secure digital token device 510, the device may communicate with base station 500b to authorize base station 500b to provide secure information to the user, as described herein. In one example, in response to the user at location 2 successfully entering a retrieval access command, secure digital token device 510 may signal base station 500b that it may begin communication of the information to the first receiver (e.g., by outputting an audio or video file, transmitting a digital signal or displaying information). In another example, secure digital token device 510 may transmit an encryption key or authorization key to base station 500b that allows the user to gain access to information stored on base station 500b or to execute program instructions on base station 500b.

In another embodiment, a third device at location 2, shown as remote object 530, may contain secure information, and the information contained in secure digital token device 510 may allow the user to gain access to information stored in remote object 530. For example, remote object 530 may be a secure chamber and secure digital token device 510 may output an "unlock command" (e.g., by displaying it or transmitting it directly to remote object 530 or base station 500b over a wireless link) in response to a valid unlock command being entered on secure digital token device 510. This "unlock" command may then be used to open remote object 530. In another example, remote object 530 may include a computer program or data that may be accessed using a digital key stored in or generated by secure digital token device 510. In yet another example, remote object 530 may be a computer or other device configured to exchange secure information with secure digital token device 510, base station 500b, or another device using encrypted messages, and secure digital token device 510 may provide the user with one or more decryption keys stored in or generated by the device so that the user may participate in the information exchange. In one embodiment, remote object 530 may be another secure digital token device similar to, or different from, secure digital token device 510.

Secure digital token device 510 may be used to authorize and/or initiate any number or type of operations in response to a user entering a valid command, according to different embodiments. Examples of uses for secure digital token device 510, some of which have already been described, include transmitting an encryption key to a base station or another device, transmitting an "unlock" command for a physical object or door, transmitting a "download" command to allow a download of secure digital information from a base station or a remote device, transmitting an "upload" command to a base station to upload information to the device or to another device, or streaming out data, audio, video from secure digital token device 510 itself.

Figure 6:
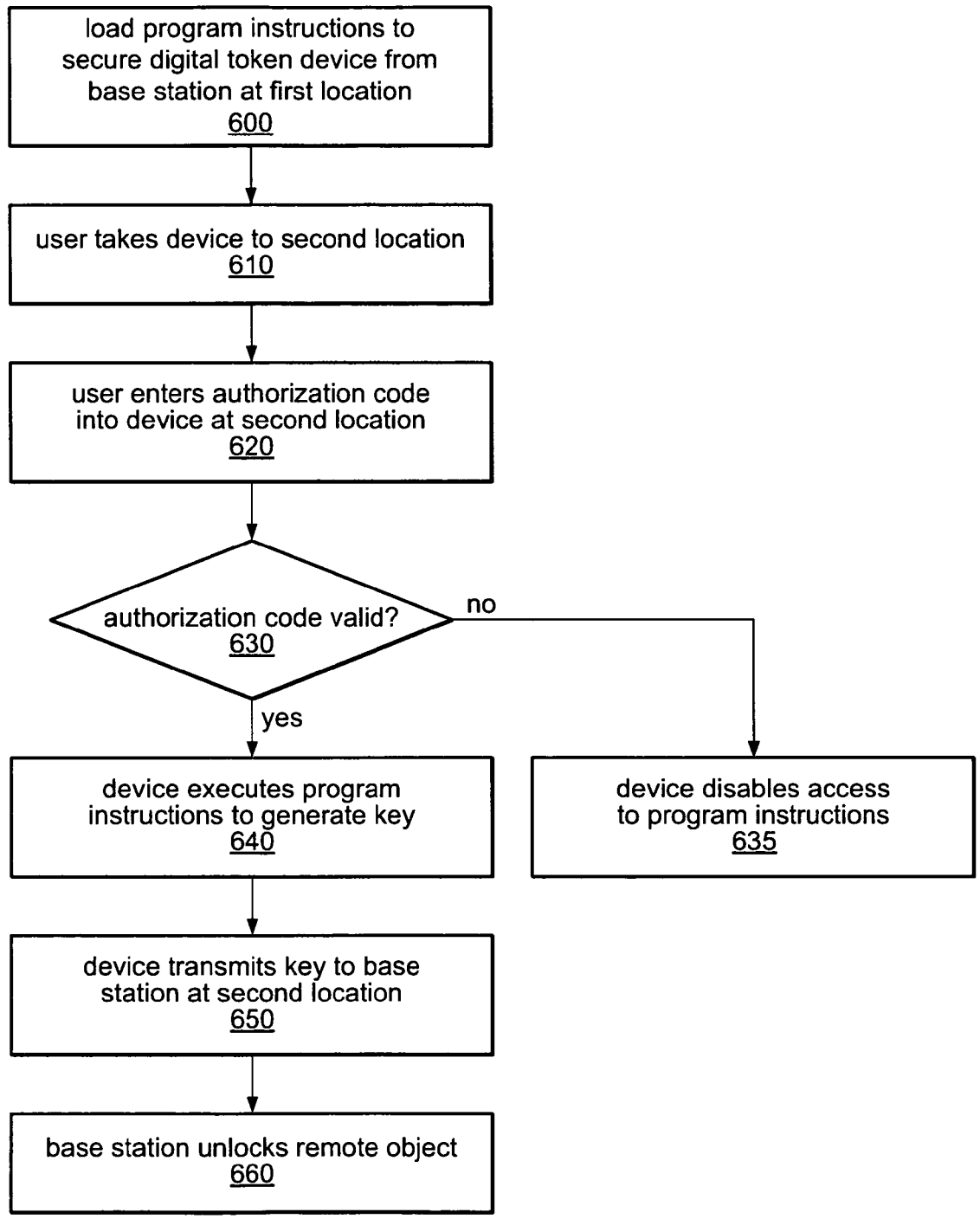
FIG. 6 illustrates a method for generation and distribution of digital encryption keys, according to one embodiment.

Secure digital token device 510 may also be used to exchange or distribute encryption keys, in some embodiments. For example, a user may enter a command into secure digital token device 510 using a gesture-based input, and this command may activate a transmitter contained in secure digital token device 510 to send an encryption key to a secure device. In another embodiment, secure digital token device 510 may include program instruction for generating encryption keys, which may then be transmitted to a secure device. FIG. 6 illustrates one such method for generation and distribution of digital encryption keys.

In this example, program instructions for generating encryption keys may be loaded into a secure token device at a first location, as in 600. The program instructions may be loaded into the device using any suitable means, including, but not limited to, those described herein. For example, as shown in 600, the program instructions may be loaded from a base station in response to an authorized user entering a valid load access code. In another embodiment, program instructions for generating encryption keys may be loaded into the device during manufacturing and/or assembly.

A user may take the programmed device to a second location, where an encryption key is needed to access secure information, as in 610. As previously noted, a gesture-based input interface may be disabled while the device is being transported to a second location, in some embodiments.

At the second location, a user (e.g., the same user or a different authorized user) may enter an authorization code into the device, as in 620. In some embodiments, the authorization code may be entered using a gesture-based input interface. The code entered may be validated by circuitry or program instructions contained on the device or on a base station at the second location, in different embodiments, as in 630. If the authorization code is not valid, the device (or base station) may be configured to disable access to the secure information, as in 635. In some embodiments, access may be disabled after a single failed attempt to enter a valid authorization code, while in others several unsuccessful attempts may be made before access is disabled.

If the authorization code is valid, illustrated by the positive exit from 630, the device may be configured to execute program instructions to generate an encryption key, as in 640. Generating an encryption key may be performed according to various cryptography methods and/or standards, according to different embodiments. For example, in one embodiment, the device may generate a different key for each authorized user, dependent on the user's own authorization code, such as a private key of a public/private key pair. In another example, the device may generate a different key for each use of the device dependent on the current time, the device's location (e.g., GPS coordinates), or some other variable, but deterministic, input, along with whatever encryption algorithms are programmed into the device.

Once the encryption key is generated, it may be transmitted to a base station at the second location, as in 650. Transmission of the information may be performed using any suitable means, including the various wireless methods described herein. In some embodiments, the encryption key may be an input to an application executing on the base station, such as a secure communication application. In other embodiments, the base station may enable secure communication on a remote object (such as another computer or secure digital token device) in response to receiving a valid generated encryption key, as in 660.

As described above regarding block 470 of FIG. 4, the secure digital token device may in some embodiments be configured to disable access to its secure digital information for an unauthorized user (i.e., a user who enters an invalid authorization or command sequence). Disabling access to the information may involve disabling further inputs (e.g., disabling the input interface), disabling output of the secure information (e.g., by disabling the output interface, or by erasing or modifying an internally stored code or flag such that a read operation of the memory containing the secure information is disabled), obliterating the secure information (e.g., by erasing or modifying the contents of the memory containing it), destroying or damaging the memory or other circuitry in the device (e.g., by causing an electrical short or current surge in the memory or in an analog device), or by damaging or destroying the device itself (e.g., by detonating an explosive charge). In some embodiments, once access to the secure information has been permanently disabled (e.g., the information erased or the device destroyed) a user may be able to provide proof of the destruction of the information by removing a certificate, tag, tab, or other physical component of the device that may only be removed if the information has been destroyed.

Figure 7:
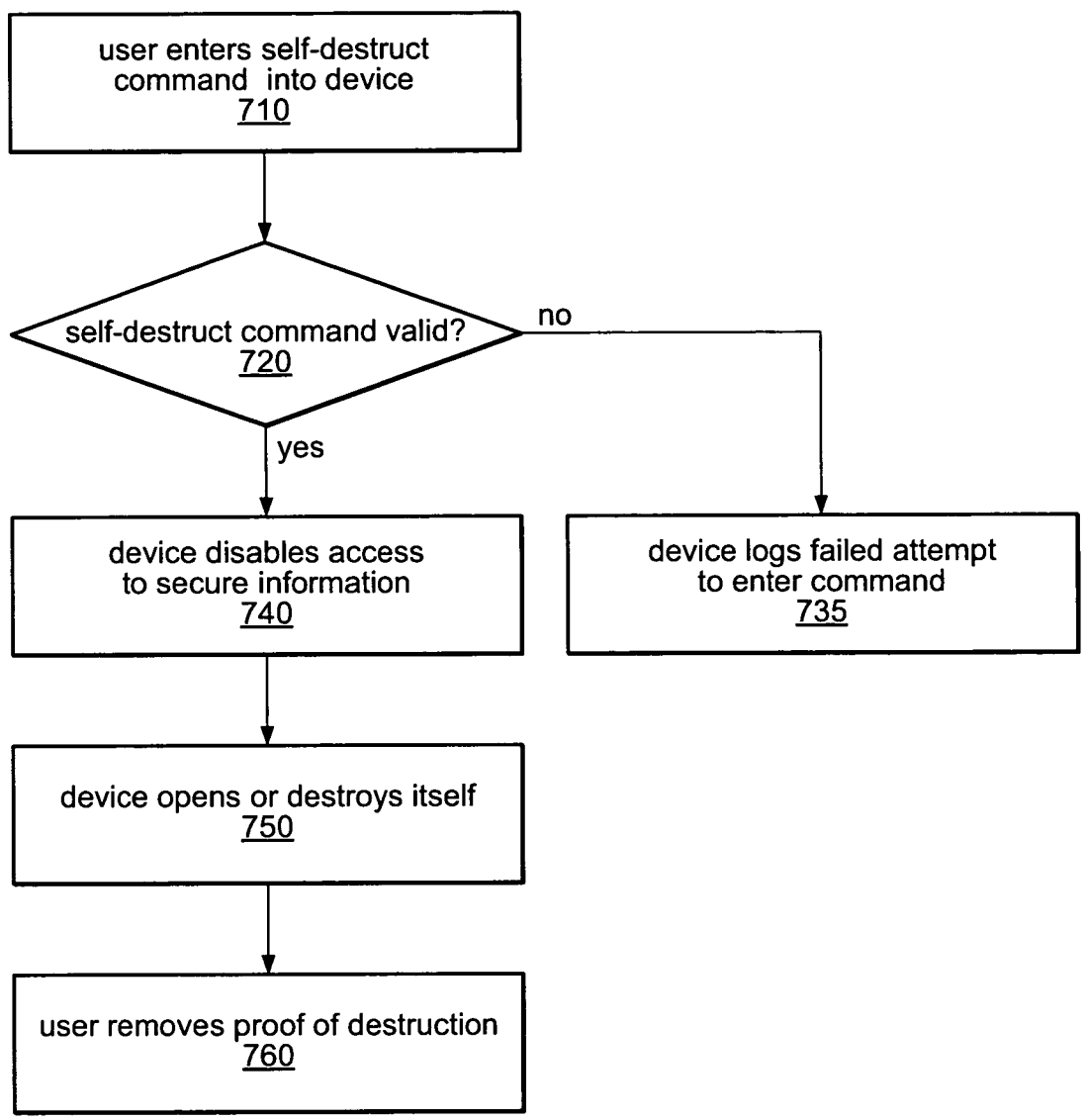
FIG. 7 illustrates one embodiment of a method for disabling access to secure digital information.

In some embodiments one or more of the actions described above for disabling access to the secure device may be performed in response to an authorized user entering a valid command indicating that the device should disable or destroy itself. An example of this self-destruct operation is illustrated in FIG. 7. If an authorized user enters this command, the operations illustrated in FIG. 7 as part of the self-destruct sequence may be performed immediately, or, in some embodiments, after a countdown. The countdown may be communicated to the user, in some embodiments. For example, the countdown may be communicated by a series of sounds from an internal sound generator, since sound may be able to penetrate a Faraday cage and/or tamper-detecting membrane, by the blinking of an LED, or by a series of vibrations. In some situations, a user may be instructed to destroy the secure device and to return physical proof of its destruction. As noted above, a physical tab or certificate may be embedded inside the tamper resistant membrane, such that upon destruction the device may be opened and the certificate removed to provide this proof, in some embodiments. The method for disabling access to secure digital information illustrated in FIG. 7 includes this proof-of-destruction concept.

As illustrated in FIG. 7, a user may initiate the self-destruct sequence by entering a "self-destruct" command into a secure digital token device, as in 710. This command may be entered using a gesture-based input interface, in some embodiments. The device itself may be configured to determine if the command is valid or that the user is authorized to issue a "self-destruct" command, in some embodiments. For example, the user may first enter an authorization code, which may include an identifier of the user and/or a PIN, and then may enter the "self-destruct" command. If the PIN is valid and/or if the user is authorized to enter a "self-destruct" command, as illustrated by the positive exit from 710, the operation may be executed.

In response to a valid self-destruct command, the device may be configured to disable access to the secure information it contains, as shown in 740. Any of the methods or means described herein for disabling the information may be used, including erasing or modifying the information, erasing or modifying an access code or status information, damaging a memory containing the information, access code or status information, or damaging or destroying the device itself, according to different embodiments.

Once access to the information has been disabled, the device may be configured to open or destroy itself, as in 750. For example, the device may be configured to release a spring mechanism, a solenoid, or a small explosive charge in response to a self-destruct command. In other embodiments, a user may apply an external force to destroy and/or open the device and/or to obtain proof of its destruction (e.g., after disabling access to the secure information by entering a command). If an external force is used to open the device and obtain the proof, the tamper detection mechanism may be configured to verify that the secure information has been obliterated or to obliterate the secure information in its memory, before the proof can be removed. In one example, the device may disable access to the secure information by erasing it, and then the device may also destroy itself by detonating a small explosive charge. In another example, the device may disable access to the information by causing a short-circuit condition that damages a memory containing the information, and then may signal an electronic switch to open a physical door on the device. In some embodiments, disabling access to the secure information is done by destroying or opening the device, rather than in a separate operation.

Once the device is opened and/or destroyed, the user may remove a physical component from the device that serves as proof of its destruction, as in 760. For example, if a door on the device is opened as part of the "self-destruct" sequence, the user may gain access to a certificate, tag, or tab inside the device and may remove it. In such embodiments, the device may be configured such that it may not be opened until and unless access to the secure information has already been disabled. In another example, a small explosive charge may be used to destroy the device after access to the secure information has been disabled, but the charge may not destroy the tab/certificate that provides proof of the destruction of the device. An example of a proof of destruction tag is illustrated in FIG. 3C, as proof of destruction tag 330. In this example, the tag is located inside a spherical secure token device (e.g., a globe) and may be removed in response to a self-destruct command causing the globe to open or break into two pieces, as illustrated in FIG. 3C.

If the "self-destruct" command is not valid or the user is not authorized to enter a "self-destruct" command, as illustrated by the negative exit from 720, the device may, in some embodiments, be configured to log the failed attempt, as in 735. In some embodiments, any attempt to enter a command that is invalid (either because an invalid sequence was entered or the user was not authorized to enter the command) may be logged by the device for further action or analysis. For example, if one or more unauthorized users attempt to enter commands on the device while it is being transported between authorized users, an authorized user may be able to determine that an attempt was made to compromise the device and/or gain access to the secure information by entering a command to output the log of failed attempts when the device reaches its destination. In another example, if an authorized user attempts to enter a particular command for which he or she is not authorized, this may be detected by an authorized user who outputs the log of failed command attempts at a later time.

In some embodiments, if a user suspects that the secure digital token device is in danger of being captured or otherwise compromised, or if he or she is instructed to destroy the device once the secure information has been communicated to the authorized receiver, he or she may execute a self-destruct sequence such as the one illustrated in FIG. 7 to prevent other users from accessing the secure information. In other embodiments, the user may destroy the device or disable access to the secure information therein by physically damaging the device, such as by prying it open, smashing or cracking it by striking it with a heavy object, etc. In some embodiments, destroying the device (and/or disabling access to its secure contents) and removing the proof-of-destruction component are performed as one action. For example, in one embodiment, a proof-of-destruction tab may protrude from the tamper-respondent housing or membrane, and physically prying the tab from the housing or membrane may cause tamper-respondent circuitry to erase the secure information.

In some embodiments, disabling access to the secure information and/or destroying the secure token device may be performed automatically by the device in response to a single unauthorized attempt to obtain access to the secure information, such as a single failed attempt to enter a valid retrieval access code. In other embodiments, these actions may not be performed unless there are multiple unauthorized attempts to access the secure information. In some embodiments, the device may be configured to track the number of failed attempts to enter a valid authorization or command sequence and, after a specified number of failed attempts, to assume that it has been comprised. In such embodiments, the device may be configured to put itself in an "unauthorized user" mode, disabling one or more functions of the device and/or logging its status as "possibly compromised", until an authorized user enters a special "reset by authorized user" code. In other embodiments, the device may be configured to destroy itself in response to detecting a specified number of failed command attempts. In still other embodiments, the device may be configured to disable or destroy itself (or its secure contents) in response to some elapsed period of time during which no commands (valid and/or invalid) are entered. For example, the device may be configured to self-destruct if it fails to receive an expected (e.g., periodic) "continue-to-operate" command.

In some embodiments, one or more of the actions described above for disabling access to the secure information may be performed in response to an attempt to physically breach the housing of the secure device or a tamper-detecting membrane enclosing the secure device. For example, an unauthorized user may attempt to remove or penetrate a tamper-detecting enclosure, and the tamper-responsive circuitry enclosed therein may trigger one of these actions. In some embodiments, the response to a physical attempt to obtain the information, such as a breach of the device's housing, may be different than the response to an attempt to gain access to the secure information by entering a command. For example, when a physical attempt to access the information is detected, the device may be configured to damage the memory or destroy the device, but when an invalid command or authorization code is entered, the device may be configured to disable the output interface until a valid authorization code or a special "reset by authorized user" code is entered.

When the secure device has been compromised, whether physically or electronically, it may be configured to transmit a signal indicating its status, which may be received by any nearby base station or other authorized device, in some embodiments. In other embodiments, an indication that the device has been (or may have been) compromised may be stored in its internal memory and may be transmitted to a base station or other authorized device when and if the secure device comes within proximity of it. In some embodiments, the device may be configured to include an indication that it may have been compromised when outputting secure information to an authorized user following an unauthorized attempt to obtain access to the information. In other embodiments, an LED on the device or an indicator on a base station in communication with the device may turn red or otherwise indicate that the device has been (or may have been compromised), or that the device has damaged or destroyed itself. In some embodiments, when an unauthorized attempt to obtain access to the secure information is detected, power is removed from a RAM containing the secure information, or containing one or more keys for accessing the information, and the RAM is erased. In such embodiments, described earlier in more detail, the device may detect that the RAM has been erased and may transmit an indication of its status (e.g., "compromised" and/or "erased") to a base station or other authorized device.

Figure 8:
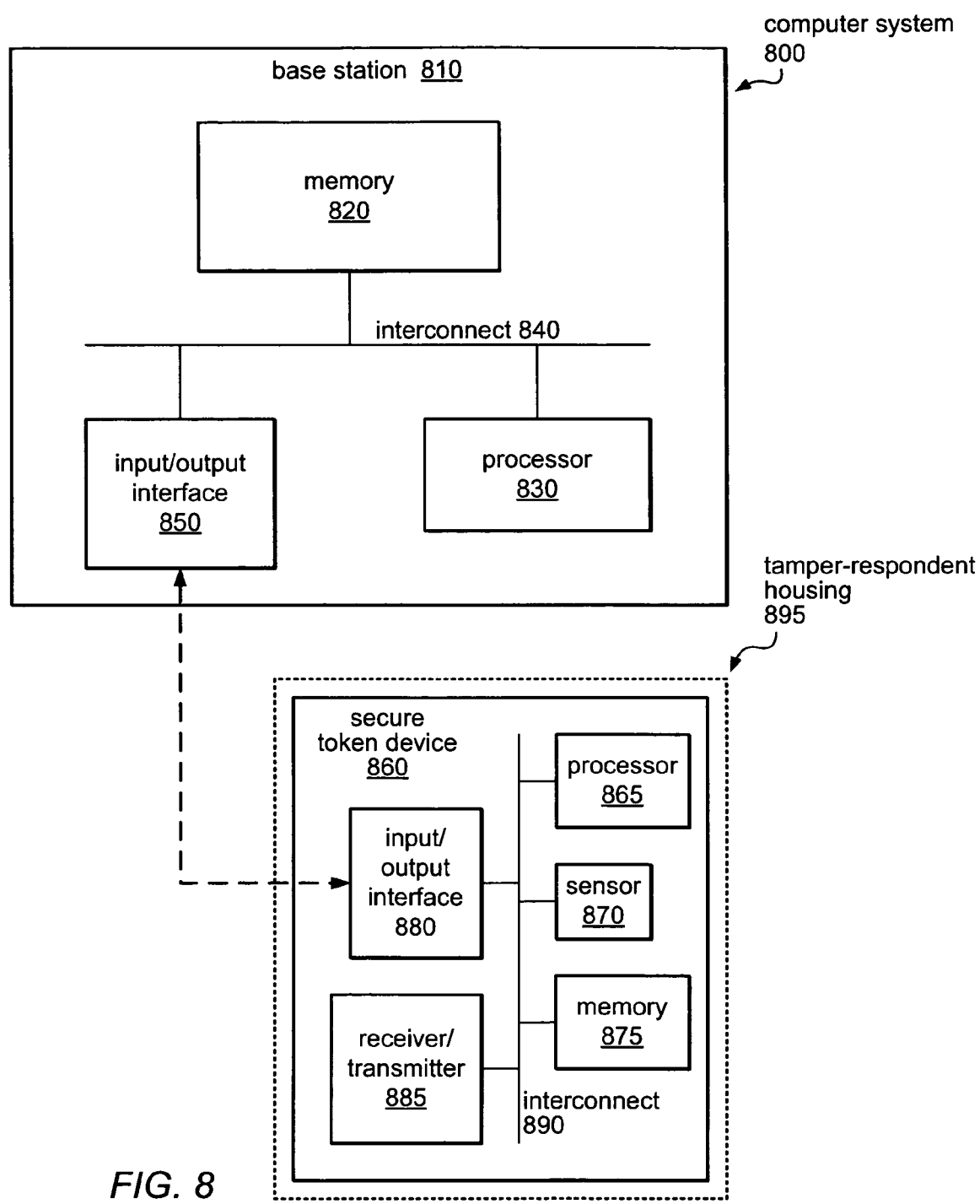
FIG. 8 illustrates a computer system suitable for implementing a tamper-respondent device for distributing secure information, according to one embodiment.

A system suitable for implementation of a secure digital token device, as described herein, may be implemented in various configurations, one of which is illustrated in FIG. 8. In this example, computer system 800 may comprise one or more base stations 810 and one or more secure token devices 860. Secure token device 860 may in some embodiments include a base that inductively charges the batteries that power the sensor(s), computer, radio, etc., in the device when it is placed on the base (not shown).

Base station 810 may be one of any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. As illustrated in FIG. 8, base station 810 may include one or more memories 820, one or more processors 830, one or more input/output interfaces 850, and an interconnect 840 for communication between the various components of base station 810. In other embodiments, base station 810 may be partitioned into more or fewer components, or the components illustrated as being part of a single base station 810 may be distributed among two or more computer systems or nodes, according various system configurations. In one embodiment, base station 810 may comprise a Sun SPOT™ base station.

As illustrated in FIG. 8, secure token device 860 may include one or more processors 865, one or more memories 875, one or more sensors 870, one or more transmitter/receivers 885, one or more input/output interfaces 880, and an interconnect 890 for communication between the various components of secure token device 860. In other embodiments, secure token device 860 may be partitioned into more or fewer components contained on one or more printed circuit boards or integrated circuit devices, or the components illustrated as being part of a single secure token device 860 may be distributed among two or more secure token devices, according various system configurations. In various embodiments, secure token device 860 may comprise a handheld, wireless device comprising a Sun SPOT™ device or another standard or custom wireless networked platform. Secure token device 860 may in some embodiments be enclosed in a tamper-respondent housing and/or tamper-detecting membrane, as described herein and indicated as 895 in FIG. 8.

Processors 830 and 865 may be configured to implement any of various instruction set architectures, such as x86, SPARC, PowerPC, etc. In some embodiments, processors 830 and 865 may include execution logic configured to implement a single CPU core, multiple CPU cores, or any combination of one or more general-purpose CPU cores and special-purpose cores (e.g., digital signal processors, hardware accelerators, co-processors, etc.) In various embodiments, processors 830 and 865 may include execution logic configured to implement a superscalar architecture or may be configured to implement multi-threading. Processors 830 and processors 865 may in some embodiments implement a common instruction set, while in other embodiments, they may execute two or more different instruction set architectures. In one embodiment, processor 865 may comprise a 32-bit ARM9 processor core operating at 180 Mhz.

Memory 875 may be implemented as any type of computer-accessible storage media, including, but not limited to, DRAM, SRAM, EDO RAM, SDRAM, DDR SDRAM, Rambus RAM, or non-volatile memory such as ROM, flash memory, magnetic or optical storage, etc., and may be implemented as a single memory module or as two or more memory modules of the same or different types, according to various embodiments. In one example, memory 875 may include a small RAM (e.g., for storing an indication of whether or not the secure token device has been tampered with) and a larger non-volatile memory (which may be used to store both secure digital information and program instructions executable to perform the functions of the secure token device described herein.) In other embodiments, memory 875 may include only RAM (containing both secure information and program instructions) or may include only non-volatile memory.

Similarly, memory 820 may be implemented as any type of computer-accessible storage media, including, but are not limited to, installation media, e.g., a CD-ROM or floppy disk, computer system memory such as DRAM, SRAM, EDO RAM, SDRAM, DDR SDRAM, Rambus RAM, flash memory, etc., or non-volatile memory such as a magnetic media, e.g., a hard drive or optical storage. Memory 820 may be implemented as one or more components of base station 810, as shown in FIG. 8, may be separate from base station 810, or may be implemented as a combination of memory local and external to base station 810, in various embodiments. In some embodiments, memory 820 may be configured to store program instructions and/or data executable by processor(s) 830 to implement one or more of the functions of base station 810 described herein. In some embodiments, memory 820 may also be configured to store program instructions and/or data executable on another computer system or another component of computer system 800, such as if memory 820 is a shared resource.

Program instructions and secure data stored in memories 820 and 875 may be implemented using any of various programming languages or methods, according to various embodiments. In some embodiments, processor 830 and/or processor 875 may be configured to implement Java™ technology, including the Java™ operating system and/or Java™ Virtual machine (e.g., JVM™ or J2ME™) and one or more Java™ application programs. In other embodiments, processor 830 and/or processor 875 may be configured to execute application programs written in C or C++. In one embodiment, secure token device 860 may be configured to implement "SquawkVM™," a small virtual machine (VM) written almost entirely in Java. The use of SquawkVM™ may allow wireless transducer applications to be executed directly on the CPU without an underlying operating system, in some embodiments, which may enable efficient use of the memory available on secure token device 860. In some embodiments, the SquawkVM™ system may be configured to put processor 875 in one of two sleep modes when all threads are inactive, which may allow for efficient power management and battery performance. A set of Java™ libraries may enable access to sensors 870 and/or the integrated on-board receiver/transmitter 885, in some embodiments.

Input/output interface 850 may be configured to implement one or more of various interface or network standards, e.g., Peripheral Component Interconnect (PCI), Ethernet, HyperTransport (HT), Infiniband, or any variant or successor of these or other suitable input/output protocols. Input/output interface 850 may in some embodiments also include a wireless input/output interface, as described herein, or two separate input/output interfaces 850 may be included in base station 810 to enable communication between base station 810 and secure token device 860 and between base station 810 and other devices. For example, input/output interface 850 may include a wireless radio transmitter and/or receiver for communicating with secure token device 860. In some embodiments, some or all of the functionality of input/output interface(s) 850 may be included in processor 830, rather than as one or more separate components.

Similarly, input/output interface 880 may be configured to implement one or more of various interface or network standards, e.g., Peripheral Component Interconnect (PCI), Ethernet, HyperTransport (HT), Infiniband, or any variant or successor of these or other suitable input/output protocols. Input/output interface 880 may also be configured to implement a wireless input interface, in some embodiments. For example, input/output interface 880 may implement a gesture-based input interface, as described herein, in some embodiments. In such embodiments, input/output interface 880 may be configured to receive input from one or more accelerometers included in sensors 870. In other embodiments, input/output interface 880 may be configured to receive other types of wireless inputs, such as light or sound, or inputs from any of various other types of wireless sensors 870. In some embodiments, secure token device 860 may include a receiver suitable for receiving transmitted signals (e.g., an 11-channel, 2.4 GHz, IEEE 802.15.4 radio with an integrated antenna), and these signals may represent one or more data values or commands transmitted by base station 810.

Interconnect 840 may couple processor 830 to memory 820, as illustrated. In some embodiments, interconnect 840 may be configured to couple processor 830 directly to a computer system network. In other embodiments, interconnect 840 may be configured to couple processor 830 to a network interface, such as input/output interface 850. In some embodiments, interconnect 840 and input/output interface 850 may be configured to implement one or more of various interface or network standards, e.g., Peripheral Component Interconnect (PCI), Ethernet, HyperTransport (HT), Infiniband, or any variant or successor of these or other suitable input/output protocols.

Similarly, interconnect 890 may be configured to implement one or more of various interface or network standards, e.g., Peripheral Component Interconnect (PCI), Ethernet, HyperTransport (HT), Infiniband, or any variant or successor of these or other suitable input/output protocols.

Sensors 870, as previously noted, may include one or more sensors for detecting movement, such as one or more 3-axis accelerometers (e.g., 2G or 6G accelerometers), in some embodiments. In other embodiments, sensors 870 may include sensors configured to detect and/or measure light, sound, temperature, or pressure, or any other input means suitable for entering data and/or commands using a wireless input/output interface.

Secure token device 860 may in some embodiments include other components and features, which may or may not be used in implementing the functionality described herein. For example, in one embodiment, secure token device 860 may include a very accurate clock, such as the one included in the Sun SPOT™ satellite AVR processor. This clock may be used to regulate a deep sleep mode, to track the dwell time for a gesture-based input interface, to execute a self-destruct sequence countdown, or for other uses, according to different embodiments. In some embodiments, secure token device 860 may contain additional features including, but not limited to, additional energy management features, more or different sleep modes, ECC security, encryption while in transit, proximity power settings, a suicide switch, user interface feedback mechanisms, or jamming technologies.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. An apparatus, comprising:
a processor means;
a memory coupled to the processor, wherein the memory stores secure digital data;
a gesture-based input interface coupled to the processor means and configured to receive one or more commands, wherein to receive a command, the gesture-based input interface is configured to detect one or more physical gestures;
an output interface coupled to the processor means;
wherein the gesture-based input interface is configured to receive one or more commands, via one or more physical gestures, requesting access to the secure digital data stored in the memory;
wherein the processor means is configured to validate commands, received via the gesture-based input interface, requesting access to secure digital data stored in the memory; and
wherein the output interface is configured to provide secure digital data stored in the memory in response to a processor means validated command received via the gesture-based input interface requesting access to the secure digital data stored in the memory;
a mechanism configured to detect tampering with the apparatus or detect a self-destruct command, wherein the mechanism is further configured to permanently disable access to the secure digital data in the memory in response to the detection of tampering with the apparatus or in response to the detection of the self-destruct command; and
a proof-of-destruction component;
wherein the mechanism is further configured to prevent removal of the proof-of-destruction component until after access to the secure digital data in the memory has been permanently disabled.

2. The apparatus of claim 1, wherein to detect one or more physical gestures applied to the apparatus, the gesture-based input interface detects movement of the apparatus using one or more accelerometers or gyroscopic sensors.

3. The apparatus of claim 1, wherein to detect the one or more physical gestures, the gesture-based input interface detects a change in a position of the apparatus.

4. The apparatus of claim 1, wherein to detect the one or more physical gestures, the gesture-based input interface detects a change in a direction or acceleration of movement of the apparatus.

5. The apparatus of claim 1, wherein the event other than a valid command received by the gesture based input interface is the processor is configured to determine that a command requesting access to secure digital data stored in the memory is not valid, and in response the processor mechanism disables access to the secure digital data stored in the memory.

6. The apparatus of claim 5, wherein to disable access to the secure digital data, the processor mechanism executes one or more of: erasing or modifying secure digital data stored in the memory, disabling output of secure digital data stored in the memory, damaging or destroying the memory containing secure digital data, or damaging or destroying the apparatus.

7. The apparatus of claim 1, further comprising a tamper-respondent surface enclosure completely enclosing the apparatus, wherein the tamper-respondent surface enclosure is configured to detect attempts to breach the enclosure, and wherein in response to detecting an attempt to breach the tamper-respondent surface enclosure access to secure digital data stored in the memory is disabled.

8. The apparatus of claim 1,
wherein the gesture-based input interface is configured to receive one or more commands to disable access to secure digital data stored in the memory;
wherein the processor validates commands received via the gesture-based input interface to disable access to secure digital data stored in the memory; and wherein, in response to the processor validating a command received via the gesture-based input interface to disable access to secure digital data stored in the memory, the processor mechanism disables access to the secure digital data stored in the memory.

9. The apparatus of claim 1,
wherein the gesture-based input interface is configured to receive commands to load secure digital data into the memory;
wherein the processor validates commands received via the gesture-based input interface to load secure digital data; and
wherein, in response to validating a command received via the gesture-based input interface to load secure digital data, the processor programs the secure digital data into the memory.

10. The apparatus of claim 9, wherein to program the secure digital data, the processor modifies secure digital data previously programmed in the memory.

11. The apparatus of claim 1, wherein to provide the secure digital data, the output interface transmits an audio signal, a radio frequency signal, or a light frequency signal representing the secure digital data.

12. The apparatus of claim 1,
wherein the gesture-based input interface is configured to receive a valid command to permanently disable access to secure digital data stored in the memory, and in response to receiving the valid command the processor mechanism initiates a self-destruct sequence to destroy the apparatus or a component thereof; and
wherein destruction of the apparatus or component causes access to the secure digital data to be permanently disabled.

* * * * *

UNITED STATES PATENT AND TRADEMARK OFFICE
CERTIFICATE OF CORRECTION

| | | |
|---|---|---|
| PATENT NO. | : 9,015,075 B2 | Page 1 of 1 |
| APPLICATION NO. | : 11/541045 | |
| DATED | : April 21, 2015 | |
| INVENTOR(S) | : Hughes et al. | |

It is certified that error appears in the above-identified patent and that said Letters Patent is hereby corrected as shown below:

Title page

On first page, column 2, under Attorney, Agent, or Firm, line 2, delete "Myertons," and insert -- Meyertons, --.

Specification

In column 2, line 41, delete "may by" and insert -- may be --.

Signed and Sealed this
Ninth Day of February, 2016

Michelle K. Lee
*Director of the United States Patent and Trademark Office*